US012766635B2

(12) United States Patent
Maeda et al.

(10) Patent No.: US 12,766,635 B2
(45) Date of Patent: Oct. 20, 2026

(54) METHOD FOR MANUFACTURING DISSIMILAR MATERIAL JOINT STRUCTURE, AND DISSIMILAR MATERIAL JOINT STRUCTURE

(71) Applicant: Kobe Steel, Ltd., Kobe (JP)

(72) Inventors: Kyohei Maeda, Kanagawa (JP); Reiichi Suzuki, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 1254 days.

(21) Appl. No.: 17/652,173

(22) Filed: Feb. 23, 2022

(65) Prior Publication Data

US 2022/0176492 A1 Jun. 9, 2022

Related U.S. Application Data

(63) Continuation of application No. PCT/JP2020/027166, filed on Jul. 10, 2020.

(30) Foreign Application Priority Data

Aug. 27, 2019 (JP) ................................ 2019-154699

(51) Int. Cl.

| | |
|---|---|
| ***B23K 26/323*** | (2014.01) |
| ***B23K 26/21*** | (2014.01) |
| ***F16B 5/08*** | (2006.01) |

(52) U.S. Cl.

CPC ........... *B23K 26/323* (2015.10); *B23K 26/21* (2015.10); *F16B 5/08* (2013.01)

(58) Field of Classification Search

CPC ........ B23K 26/322; B23K 26/323; F16B 5/08

See application file for complete search history.

(56) References Cited

U.S. PATENT DOCUMENTS 5,183,991 A * 2/1993 Arai .................... B23K 26/323 219/121.84

7,850,059 B2 * 12/2010 Kobayashi .......... B23K 26/211 228/178

(Continued)

FOREIGN PATENT DOCUMENTS

DE 102016218488 A1 * 3/2018 ............ B23K 26/60

JP 2012-201890 A 10/2012

(Continued)

*Primary Examiner* — Jonathan P Masinick

(74) *Attorney, Agent, or Firm* — Oblon, McClelland, Maier & Neustadt, L.L.P.

(57) ABSTRACT

A method for manufacturing a joint structure of dissimilar materials, the method includes: forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy; overlapping the aluminum or aluminum alloy material and a steel material such that the low-temperature thermal spray coating and the steel material face each other; and joining the aluminum or aluminum alloy material and the steel material by laser a welding from a steel material side, in which the joining is performed under welding conditions in which a fusion zone is formed in the steel material, the low-temperature thermal spray coating, and the aluminum or aluminum alloy material.

5 Claims, 6 Drawing Sheets

(56) References Cited

U.S. PATENT DOCUMENTS

| | | | | |
|---|---|---|---|---|
| 8,221,899 | B2 * | 7/2012 | Takeda | C22C 21/06 428/629 |
| 9,339,887 | B2 * | 5/2016 | Kinefuchi | B23K 9/167 |
| 10,195,689 | B2 * | 2/2019 | Yang | B23K 26/244 |
| 11,173,570 | B2 * | 11/2021 | Fujii | B23K 26/211 |
| 2010/0176095 | A1 * | 7/2010 | Chen | B23K 26/32 219/118 |
| 2013/0327749 | A1 * | 12/2013 | Denney | B23K 9/0956 219/146.1 |
| 2014/0069700 | A1 | 3/2014 | Hirano et al. | |
| 2016/0001403 | A1 * | 1/2016 | Matsumoto | C22C 21/16 219/137 R |
| 2017/0197269 | A1 * | 7/2017 | Matsumoto | B23K 3/06 |
| 2017/0297137 | A1 * | 10/2017 | Perry | C22C 9/00 |
| 2017/0314595 | A1 * | 11/2017 | Tokunaga | B23K 26/211 |
| 2017/0349221 | A1 * | 12/2017 | Yamada | B23K 11/20 |
| 2018/0043472 | A1 * | 2/2018 | Yang | B23K 26/322 |
| 2018/0073532 | A1 * | 3/2018 | Whalen | F16B 17/008 |
| 2018/0214983 | A1 * | 8/2018 | Yang | B23K 26/322 |
| 2018/0243861 | A1 * | 8/2018 | Wang | B23K 26/244 |
| 2018/0281111 | A1 * | 10/2018 | Kassai | H01M 50/107 |
| 2018/0361708 | A1 | 12/2018 | Hirano | |
| 2019/0061056 | A1 * | 2/2019 | Yang | B23K 26/322 |
| 2019/0126402 | A1 * | 5/2019 | Yang | B23K 26/044 |
| 2019/0232419 | A1 | 8/2019 | Hahnlen | |
| 2021/0101226 | A1 | 4/2021 | Hahnlen | |
| 2021/0291298 | A1 * | 9/2021 | Maeda | B32B 15/012 |
| 2022/0168835 | A1 * | 6/2022 | Suzuki | B62D 27/02 |
| 2022/0274199 | A1 * | 9/2022 | Suzuki | B23K 9/235 |
| 2023/0256541 | A1 * | 8/2023 | Maeda | B23K 26/322 219/121.64 |
| 2024/0301903 | A1 * | 9/2024 | Anasenzl | F16B 5/08 |

FOREIGN PATENT DOCUMENTS

| | | | |
|---|---|---|---|
| JP | 2013-188780 | A | 9/2013 |
| JP | 2017-115207 | A | 6/2017 |
| JP | 2019-130589 | A | 8/2019 |
| KR | 10-2017-0058427 | A | 5/2017 |
| KR | 10-2018-0013481 | A | 2/2018 |

* cited by examiner

METHOD FOR MANUFACTURING DISSIMILAR MATERIAL JOINT STRUCTURE, AND DISSIMILAR MATERIAL JOINT STRUCTURE

CROSS REFERENCE TO RELATED APPLICATION

This is a continuation of International Application No. PCT/JP2020/027166 filed on Jul. 10, 2020, and claims priority from Japanese Patent Application No. 2019-154699 filed on Aug. 27, 2019, the entire disclosures of which are incorporated herein by reference.

TECHNICAL FIELD

The present invention relates to a method for manufacturing a joint structure of dissimilar materials, and a joint structure of dissimilar materials, and particularly, to a method for manufacturing a joint structure of dissimilar materials and a joint structure of dissimilar materials, by which an aluminum or an aluminum alloy material is joined to a steel material.

BACKGROUND ART

In recent years, in order to reduce the weight of a vehicle body and to enhance collision safety for the purpose of reducing the amount of $CO_2$ emissions, a high tensile strength steel (HTSS) sheet has been applied to a body frame of an automobile or the like.

Further, for the purpose of further reducing the weight of the vehicle body, a demand for a lightweight dissimilar metal joining material obtained by joining an aluminum or aluminum alloy material and a steel material. As a method for joining dissimilar metals, there is generally a method of joining dissimilar metals with a nail, a screw, or the like. However, since the nail or the screw is relatively expensive, there is a problem in that the manufacturing cost of the joining material increases, and the resulting joining material becomes heavy by the weight of the nail or the screw.

On the other hand, when an aluminum or aluminum alloy material and a steel material are directly welded by a common method, a fragile intermetallic compound is formed at a joining interface, and a good strength cannot be obtained. Therefore, there is a demand for a welding technique by which a high strength can be obtained in the joining between an aluminum or aluminum alloy material and a steel material.

As a method for joining dissimilar metals by welding, Patent Literature 1 discloses a joining method in which an aluminum or aluminum alloy coating is formed by a cold spray method on a surface of a first base material made of steel, and the coating and a second base material made of aluminum or an aluminum alloy are welded in a manner of facing each other.

Patent Literature 1: JP-A-2013-188780

SUMMARY OF INVENTION

When the aluminum or aluminum alloy material is an extruded material having a closed cross section, welding performed by one-sided construction from a high tensile strength steel material side is required, and the joining method described in Patent Literature 1 uses an arc welding with large heat effects, such as a tungsten inert gas (TIG) welding, a metal inert gas (MIG) welding, and a plasma welding. Therefore, in the case where a metal coating that can be welded with steel is formed on a surface of the aluminum or aluminum alloy material by cold spray, and the coating and the high tensile strength steel are welded, the adhesion strength of the metal coating to the high tensile strength steel may be significantly reduced by a large amount of heat generated during the arc welding, and the joining strength may be lowered.

As the welding by which an amount of heat input at the time of welding can be prevented to an extent that the aluminum or aluminum alloy material is not melted, laser welding is considered, but laser welding is not mentioned in the joining method in Patent Literature 1. In addition, in the case of welding a metal thermal spray coating, there is a disadvantage that large blowholes are easily generated in a weld metal due to residual gas contained in the coating at the time of thermal spraying, and there is a problem that joint strength decreases when a large amount of large blowholes remain in the weld metal, but the problem of blowholes is not described in the joining method in Patent Literature 1. For this reason, there has been a demand for development of a method for manufacturing a joint structure of dissimilar materials by which one-sided construction can be enabled from the high tensile strength steel material side and the joint strength is excellent.

The present invention has been made in view of the problems described above, and an object thereof is to provide a method for manufacturing a joint structure of dissimilar materials and a joint structure of dissimilar materials, by which, in dissimilar material joining between an aluminum or aluminum alloy material and a steel material, welding performed by one-side construction from a steel material side is enabled, the number of blowholes is small, and the joint strength is excellent.

The above object of the present invention is achieved by the following configuration (1) related to a method for manufacturing a joint structure of dissimilar materials.

(1) A method for manufacturing a joint structure of dissimilar materials, the method including:
- forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;
- overlapping the aluminum or aluminum alloy material and a steel material such that the low-temperature thermal spray coating and the steel material face each other; and
- joining the aluminum or aluminum alloy material and the steel material by a laser welding from a steel material side,
- wherein the joining is performed under a welding condition in which a fusion zone is formed in the steel material, the low-temperature thermal spray coating, and the aluminum or aluminum alloy material.

A preferred embodiment of the present invention related to the method for manufacturing a joint structure of dissimilar materials relates to the following (2).

(2) The method for manufacturing a joint structure of dissimilar materials according to (1), wherein the joining is performed by laser radiation at least twice, and an amount of heat input in a second or subsequent laser radiation is equal to or less than an amount of heat input in a first laser radiation.

The above object of the present invention is achieved by the following configuration (3) related to a joint structure of dissimilar materials.

(3) A joint structure of dissimilar materials including:

an aluminum or aluminum alloy material;

a low-temperature thermal spray coating formed on at least a part of a surface of the aluminum or aluminum alloy material and formed by low-temperature thermal spraying a metal powder of at least one metal selected from the group consisting of pure iron, carbon steel, stainless steel, nickel, a nickel alloy, cobalt, and a cobalt alloy;

a steel material overlapped on the low-temperature thermal spray coating; and a weld metal by which a fusion zone is formed in the steel material, the low-temperature thermal spray coating, and the aluminum or aluminum alloy material.

In addition, the above object of the present invention is achieved by the following configuration (4) related to a method for manufacturing a joint structure of dissimilar materials.

(4) A method for manufacturing a joint structure of dissimilar materials, the method including:

forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;

overlapping the aluminum or aluminum alloy material and a steel material such that the low-temperature thermal spray coating and the steel material face each other; and joining the aluminum or aluminum alloy material and the steel material by a laser welding from a steel material side, wherein the joining is performed by laser radiation at least twice under a condition in which the low-temperature thermal spray coating is partially penetrated, and an amount of heat input in a second or subsequent laser radiation is equal to or less than an amount of heat input in a first laser radiation.

A method for manufacturing a joint structure of dissimilar materials according to the present invention includes: forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy; overlapping the aluminum or aluminum alloy material and a steel material such that the low-temperature thermal spray coating and the steel material face each other; and joining the aluminum or aluminum alloy material and the steel material by a laser welding from a steel material side, in which the joining is performed under a welding condition in which a fusion zone is formed in the steel material, the low-temperature thermal spray coating, and the aluminum or aluminum alloy material, so that a joint structure of dissimilar materials is obtained by which welding performed by one-side construction from a steel material side is enabled, the number of blowholes is small, and the joint strength is excellent.

In another method for manufacturing a joint structure of dissimilar materials according to the present invention, the joining is performed by laser radiation at least twice under a condition in which the low-temperature thermal spray coating is partially penetrated, and an amount of heat input in a second or subsequent laser radiation is equal to or less than an amount of heat input in a first laser radiation, so that a joint structure of dissimilar materials is obtained by which the generation of blowholes is significantly prevented, and the joint strength is excellent.

DESCRIPTION OF EMBODIMENTS

Hereinafter, each embodiment of the present invention will be described in detail. It should be noted that the present invention is not limited to the embodiment described below, and can be optionally changed without departing from the scope of the present invention.

The present inventors have conducted intensive studies to obtain a joining method by which a good joint can be obtained even by welding performed by one-sided construction from a steel side in dissimilar material joining between an aluminum or aluminum alloy material and a steel material. As a result, it has been found that a good joint can be obtained by forming a low-temperature thermal spray coating on at least a part of a surface of the aluminum or aluminum alloy material by low-temperature thermal spraying metal powders that can be welded to a steel material, and joining the low-temperature thermal spray coating and the steel material by the laser welding from the steel side.

Specifically, when a metal coating (a low-temperature thermal spray coating) is formed on a surface of an aluminum or aluminum alloy sheet by spraying a predetermined metal powder at a high speed through a low-temperature thermal spray method (cold spray method), a high-strength mechanical bond can be obtained between the aluminum or aluminum alloy sheet and the metal coating. Therefore, a good joint can also be obtained for a joint structure of dissimilar materials obtained by the laser welding between the aluminum or aluminum alloy sheet and the steel material after the formation of the metal coating.

Furthermore, laser welding conditions are important factors in order to prevent blowholes generated in a fusion zone in laser welding of a steel material and a low-temperature thermal spray coating formed on an aluminum or aluminum alloy sheet. It has been found that a joint with less blowholes and high joining strength can be obtained by properly managing the laser welding conditions.

First Embodiment

A method for manufacturing a dissimilar metal joint product according to the present embodiment of the present invention includes: forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy; overlapping the aluminum or aluminum alloy material and a steel material such that the low-temperature thermal spray coating and the steel material face each other; and joining the low-temperature thermal spray coating and the steel material by a laser welding from a steel material side.

Figure 1:
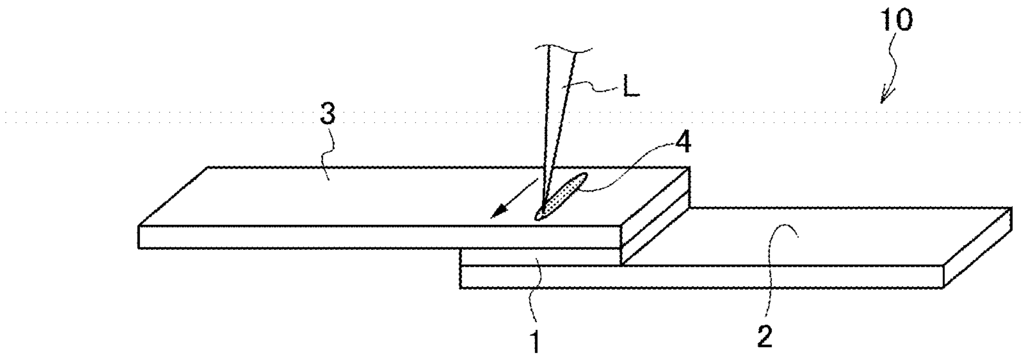
FIG. 1 is a perspective view of forming a joint structure of dissimilar materials according to a first embodiment of the present invention by a laser welding.

As shown in FIG. 1, in a joint structure of dissimilar materials 10 according to the present embodiment, a low-temperature thermal spray coating 1 is formed on at least a part of a surface of an aluminum or aluminum alloy material 2. Next, the aluminum or aluminum alloy material 2 and the steel material 3 are overlapped such that the low-temperature thermal spray coating 1 and the steel material 3 face each other. Further, the steel material 3 and the aluminum or aluminum alloy material 2 are laser-welded through the low-temperature thermal spray coating 1 under welding conditions in which a fusion zone is formed in the steel material 3, the low-temperature thermal spray coating 1, and the aluminum or aluminum alloy material 2 by a laser beam L irradiated from a steel material 3 side, and a weld metal (weld bead) 4 is formed by melting the steel material 3, the low-temperature thermal spray coating 1, and the aluminum or aluminum alloy material 2.

The low-temperature thermal spray coating 1 contains at least one metal selected from pure iron, carbon steel, stainless steel, nickel, a nickel alloy, cobalt, and a cobalt alloy. Although not shown, on the surface of the aluminum or aluminum alloy material 2 to which the metal powder is blown at a high speed by low-temperature thermal spraying, fine irregularities are formed by a large amount of metal powder, and thus the low-temperature thermal spray coating 1 and the steel material 3 are mechanically and firmly bonded to each other by an anchor effect.

A cold spray method is suitable as a method for forming the low-temperature thermal spray coating 1 by spraying a metal powder at a low temperature and at a high speed. The cold spray method is a method in which the low-temperature thermal spray coating 1 is formed by blowing a gas and a metal powder to an object at a high speed equal to or higher than the speed of sound. In this method, since the working gas has a relatively low temperature (for example, 900° C. or lower, which is equal to or lower than the melting point of ion particles), the metal powder having a relatively high melting point, such as iron, and the aluminum or aluminum alloy material do not melt each other, and the metal powder having a relatively high melting point such as iron eats into the aluminum or aluminum alloy material 2 due to the speed energy thereof to establish a macroscopically mechanically fastening state therebetween.

Therefore, as an intermetallic compound is less likely to be generated and a brittle phase is less likely to be formed, as a result, a strong low-temperature thermal spray coating (iron-based coating in the present embodiment) 1 is formed on a part of the aluminum or aluminum alloy material 2. As will be described later, in the cold spray method, the gas species, the pressure, the temperature, the particle size of the metal powder, and the like to be used can be appropriately selected and carried out.

As a method for forming the low-temperature thermal spray coating 1, other than the cold spray method, other thermal spraying methods such as plasma spraying and arc spraying can be considered. However, according to those methods, the temperature of working gas is so high (for example, 2000° C. or higher, which is equal to or higher than the melting point of the iron particles), that it exceeds the melting points of the particles and the aluminum base material and the particles and the aluminum base material are melted, thus the intermetallic compound is generated by a chemical reaction and only a brittle coating can be formed.

Thereafter, the steel material 3 is disposed on the obtained low-temperature thermal spray coating 1, and the weld metal 4 is formed by the laser welding from the side of the steel material 3 opposite to the side facing the aluminum or aluminum alloy material 2 under welding conditions in which a fusion zone is formed in the steel material 3, the low-temperature thermal spray coating 1, and the aluminum or aluminum alloy material 2, thereby manufacturing the joint structure of dissimilar materials 10.

Figure 2:
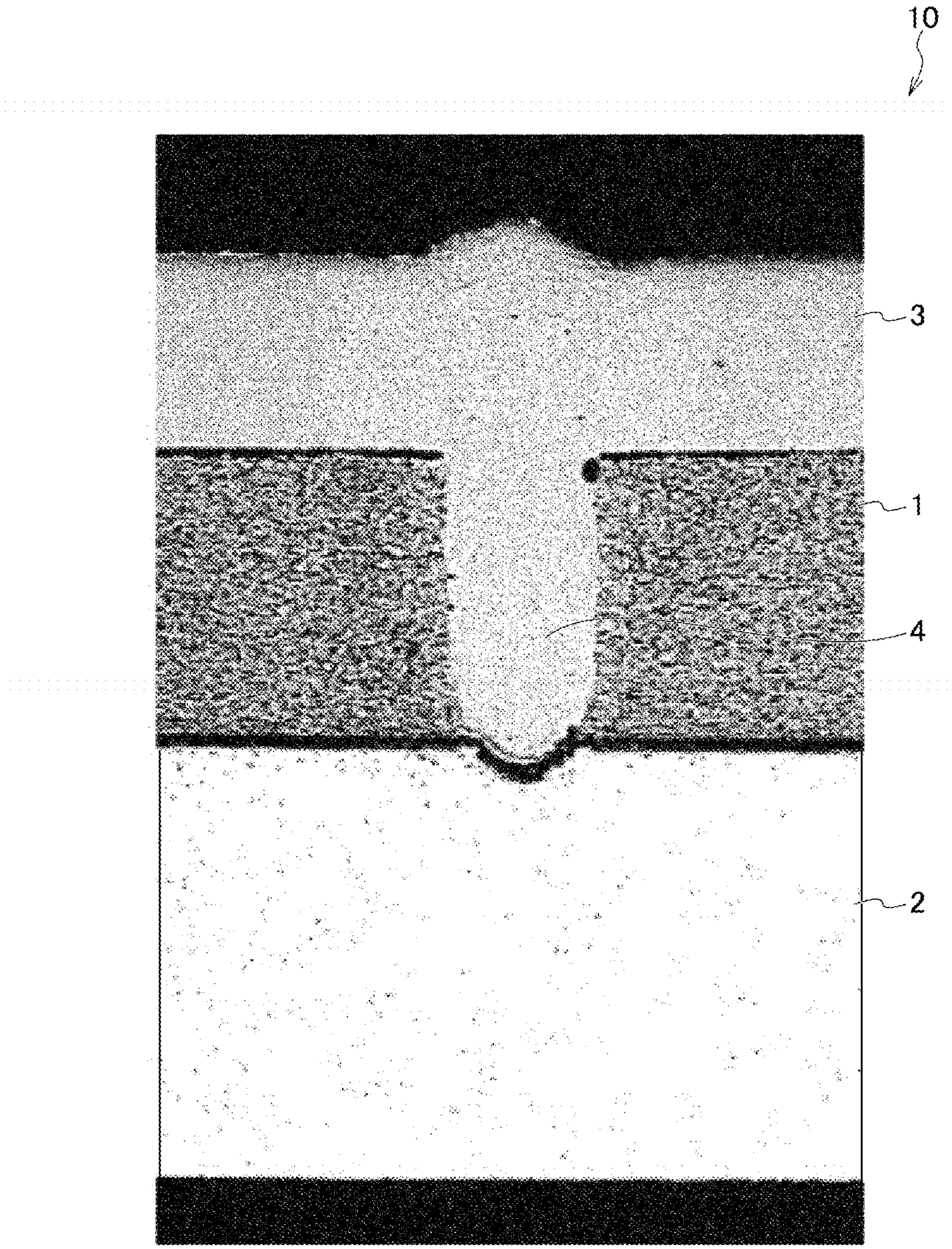
FIG. 2 is an enlarged cross sectional view of a joint structure of dissimilar materials in Example 1 formed by a method for manufacturing a joint structure of dissimilar materials in the first embodiment.

As shown in FIG. 2 (corresponding to Example 1 to be described later) and FIG. 3 (corresponding to Example 2 to be described later), when the steel material 3 and the aluminum or aluminum alloy material 2 having the low-temperature thermal spray coating 1 are laser-welded from the steel material 3 side, the weld metal (weld bead) 4 composed of the steel material 3, the low-temperature thermal spray coating 1, and the aluminum or aluminum alloy material 2 is formed and welded by welding together with together with the steel material 3 and the low-temperature thermal spray coating 1 under a condition in which a part of the aluminum or aluminum alloy material 2 is melted.

When the amount of heat input is excessively large, the aluminum or aluminum alloy material 2 is excessively melted, so that the bead becomes unstable or the weld portion is likely to be cracked. Therefore, it is preferable to suppress the amount of heat input as much as possible. In addition, it is preferable to perform welding under heat input conditions such that the amount of aluminum contained in the weld metal 4 is preferably 5% or less, and more preferably 1% or less.

By controlling the amount of heat input such that a part of the aluminum or aluminum alloy material 2 is melted, the generation of blowholes 5 can be significantly prevented, and the joining strength of the joint structure of dissimilar materials 10 is improved. It is considered that this is because the improvement in strength due to the absence of the blowholes 5 is larger than the reduction in strength due to the melting of a part of the aluminum or aluminum alloy material 2.

Here, the laser welding is a welding method in which heat input is low and thermal effect is small as compared with other welding methods such as arc welding. When the arc welding is used, the heat generated during welding is likely to reach the aluminum or aluminum alloy material 2. Therefore, the adhesion strength of the metal coating to the high tensile strength steel is greatly reduced, which may lead to a decrease in the joining strength. However, when the laser welding is used, the thermal effect on the aluminum or aluminum alloy material 2 can be inhibited to a minimum level, and the adhesion strength of the metal coating to the high tensile strength steel can be suppressed. Therefore, a decrease in joining strength can be prevented, and a good joint can be obtained.

Subsequently, in the manufacturing method according to the present embodiment, the low-temperature thermal spray coating 1, the metal powder used as a material thereof, the aluminum or aluminum alloy material 2, and the steel material 3 are described in detail below.

<Metal Type of Metal Powder: At Least One Selected from Pure Iron, Carbon Steel, Stainless Steel, Nickel, Nickel Alloy, Cobalt, and Cobalt Alloy>

In order to join the low-temperature thermal spray coating 1 and the steel material 3 by the laser welding, it is important to select a metal material, which can be welded with the steel material 3 at desired joining strength and by which properties of the welded metal 4 becomes good, as a material of the low-temperature thermal spray coating 1.

In the present embodiment, stainless steel (SUS) capable of welding a good joint between the low-temperature thermal spray coating 1 and the steel material 3 can be suitably selected.

In particular, among various stainless steel, ferritic stainless steel, austenitic stainless steel, and ferritic and austenitic two-phase stainless steel are excellent in corrosion resistance as compared with martensitic stainless steel, and are therefore suitable as materials for automobiles exposed to corrosive environments. Therefore, as the metal powder used for the cold spray, a powder made of at least one metal selected from ferritic stainless steel, austenitic stainless steel, and ferritic and austenitic two-phase stainless steel is preferably used.

On the other hand, when stainless steel (SUS) in which a large amount of a quenching element such as Cr and Ni is added is used as the metal powder, and the steel material 3 is a high tensile strength steel sheet or a hot stamp material, all or part of the welded metal 4 subjected to dilution of the base material undergoes martensitic transformation, the hardness becomes too high, and there is a concern that the joining strength (joint strength) may decrease or a crack may occur. In such a case, a powder containing at least one metal selected from pure iron, carbon steel, nickel, a nickel alloy, cobalt, and a cobalt alloy is preferably used as the metal powder used for the cold spray.

In the present specification, pure iron is easily available for industrial use and has a purity of 99.9 mass % or more. The carbon steel is mainly composed of iron and carbon, and represents a steel material containing trace amounts of silicon, manganese, impurity phosphorus, sulfur, copper, and the like. As the nickel alloy, an alloy containing Ni as a main component and an appropriate amount of Mo, Fe, Co, Cr, Mn, or the like that is commonly called an inconel alloy, an incoloy alloy, and a hastelloy alloy can be used.

<Particle Diameter and Shape of Metal Powder>

The particle diameter of the metal powder that is the material of the low-temperature thermal spray coating 1 is not particularly limited, but when the gas pressure of the cold spray is set to a low pressure condition of 1 MPa or less, the particle diameter is, for example, preferably 20 μm or less, and more preferably 10 μm or less.

On the other hand, when the gas pressure is a high pressure condition of 1 MPa to 5 MPa, for example, the particle diameter is preferably 50 μm or less, and more preferably 30 μm or less.

The particle shape of the metal powder is not particularly limited, but is preferably spherical from the viewpoint of fluidity.

<Type of Working Gas>

The gas used in the cold spray is not particularly limited, but is generally performed using air, nitrogen, helium, or a mixed gas thereof. On the other hand, when the low-temperature thermal spray coating 1 is oxidized, the weldability may be adversely affected. Therefore, it is preferable to use nitrogen gas or helium gas as the gas species. When helium is used as the gas species, the adhesion strength of the low-temperature thermal spray coating further increases, and thus improvement in joint strength can be expected.

<Temperature of Working Gas>

As described above, when the temperature of the gas used in the cold spray is high, the metal powder may be melted and cause a chemical reaction with the aluminum or aluminum alloy material 2 serving as a base material of the low-temperature thermal spray coating 1 to generate an intermetallic compound. Therefore, the temperature of the working gas is preferably set to a temperature lower than the melting point of the metal powder used for the cold spray. In order to obtain the dissimilar metal joint product according to the present embodiment, it is preferable to set the temperature of the working gas to room temperature (20° C.) to 1200° C., for example.

<Thickness of Coating>

When the thickness of the low-temperature thermal spray coating 1 formed by the cold spray is less than 0.3 mm, it may be difficult to melt only the low-temperature thermal spray coating 1 and the steel material 3 due to the influence of the variation of the laser beam L in a case where welding for melting only the low-temperature thermal spray coating 1 and the steel material 3 is required (for example, a welding method in a second embodiment described later), and therefore robustness deteriorates.

Therefore, by setting the thickness of the low-temperature thermal spray coating 1 to 0.3 mm or more, it is possible to flexibly cope with the variation of the laser beam L, and thus strict condition settings is not required. Therefore, the thickness of the low-temperature thermal spray coating 1 is preferably 0.3 mm or more, and more preferably 0.6 mm or more.

On the other hand, when the thickness of the low-temperature thermal spray coating 1 exceeds 3 mm, the coating forming time may be long and the manufacturing cost may increase. Therefore, the thickness of the low-temperature thermal spray coating 1 is preferably 3 mm or less, and more preferably 2 mm or less.

<Aluminum or Aluminum Alloy Material>

The aluminum or aluminum alloy material 2 is not particularly limited, but when applied to a member used for an automobile or the like, from the viewpoint of strength, it is preferable to use an aluminum alloy material such as 2000 series, 5000 series, 6000 series, and 7000 series. In the present embodiment, laser welding in which welding performed by one-sided construction from the steel material 3 side is enabled is used, so that not only a plate material but also an extruded material, a cast material, or a forged material, which is often used in the field of automobiles or the like, can be used without any problem <Steel Material>

The steel material 3 is not particularly limited as long as the steel material is a member made of a metal commonly called steel. However, in recent years, a high tensile strength steel material (a high tensile material) or the like has been widely used as a steel sheet used for a body skeleton of an automobile or the like for the purpose of reducing weight of a vehicle body and enhancing the collision safety. Mechanical joining methods popular as dissimilar metal joining methods between steel and aluminum cannot be easily applied to a steel sheet having a tensile strength of 980 MPa or more. Therefore, the present invention is particularly effective in a high tensile strength steel sheet having a tensile strength of 980 MPa or more.

Second Embodiment

A method for manufacturing a dissimilar metal joint product according to a second embodiment will be described. The method for manufacturing a dissimilar metal joint product according to the present embodiment is different from the method for producing a dissimilar metal joint product according to the first embodiment in the joining. The other configurations are the same as those of the method for manufacturing a dissimilar metal joint product according to the first embodiment, and therefore, different parts will be described.

Figure 4:
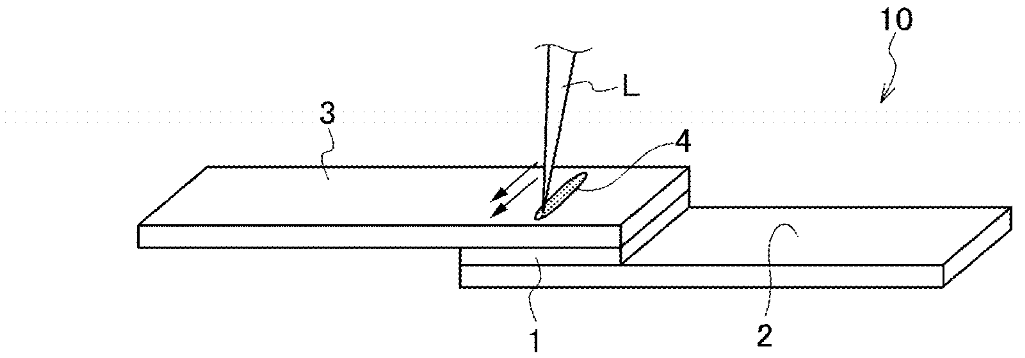
FIG. 4 is a perspective view of forming a joint structure of dissimilar materials according to a second embodiment of the present invention by a laser welding.
Figure 5:
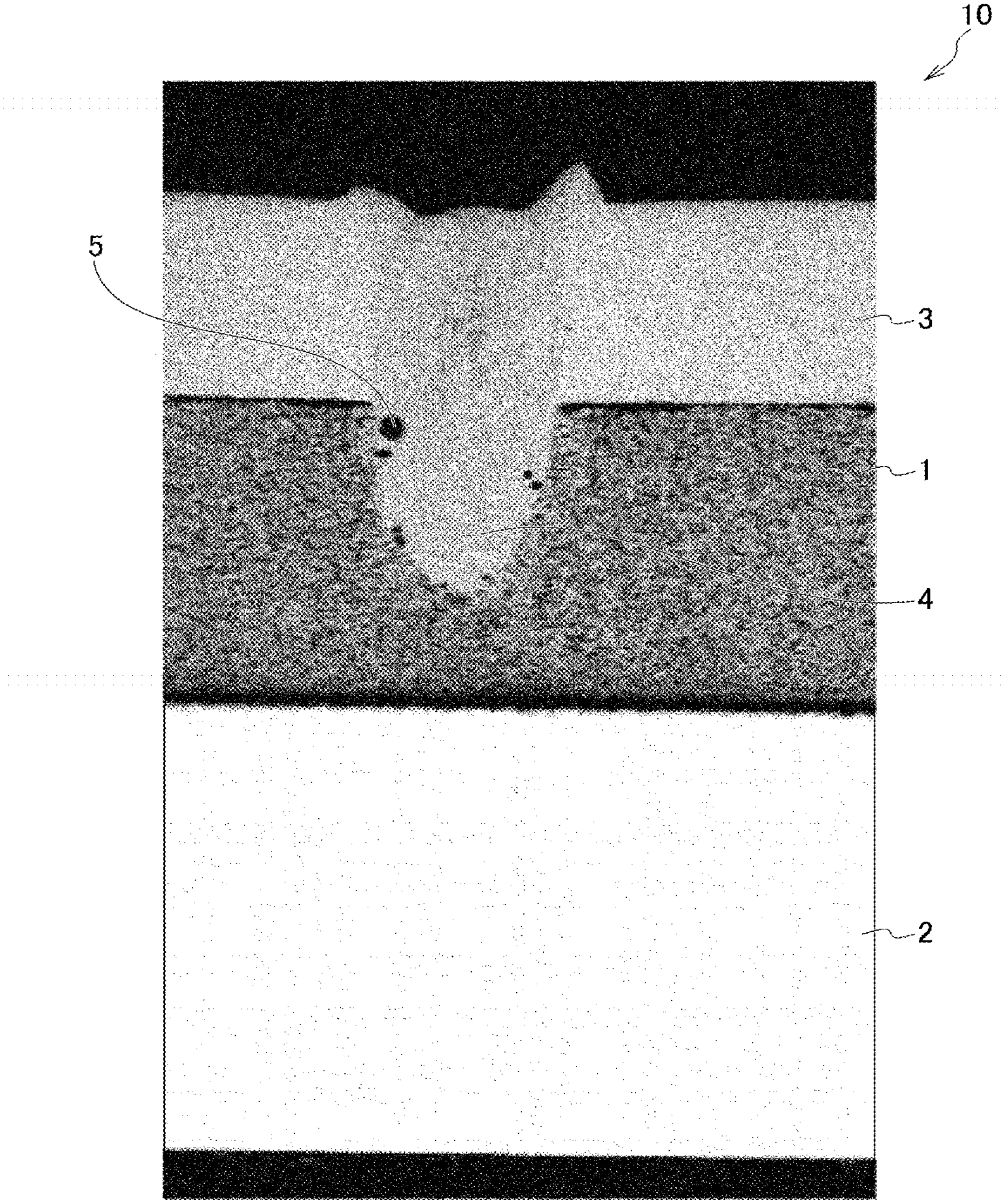
FIG. 5 is an enlarged cross sectional view of a joint structure of dissimilar materials in Example 3 formed by the method for manufacturing a joint structure of dissimilar materials in the second embodiment.

As shown in FIGS. 4 and 5 (corresponding to Example 3 to be described later), the joining according to the present embodiment is performed by laser radiation at least twice under a condition in which the low-temperature thermal spray coating 1 is partially penetrated. Specifically, the steel material 3 and a part of the low-temperature thermal spray coating 1 are melted to form the weld metal 4 to manufacture the joint structure of dissimilar materials 10. Note that two arrows in FIG. 4 schematically indicate that laser welding from the steel material 3 side is performed twice at substantially the same position.

At that time, it is preferable that the amount of heat input in the second or subsequent laser radiation is equal to or less than the amount of heat input in the first laser radiation. When the amount of heat input in the second or subsequent laser radiation is larger than the amount of heat input in the first laser radiation, the blowholes 5 are generated from the newly melted low-temperature thermal spray coating 1, which is not preferable.

Accordingly, even when the blowholes 5 are generated by the first laser radiation, the blowholes 5 generated by the first laser radiation can be eliminated by the second or subsequent laser radiation in which the amount of heat input is equal to or less than that of the first laser radiation. As a result, the number of blowholes 5 is reduced, and the joining strength is improved.

In addition, the laser radiation may be performed three times or more, but burn-through easily occurs and a tact time also becomes long. Therefore, the number of times of irradiation is preferably small, and specifically, twice is most preferable.

Although FIG. 5 shows a case where the fusion zone is not formed in the steel material 3, the low-temperature thermal spray coating 1, and the aluminum or aluminum alloy material 2 in the first laser radiation, as shown in the first embodiment, the weld metal (weld bead) 4 composed of the steel material 3, the low-temperature thermal spray coating 1, and the aluminum or aluminum alloy material 2 is formed and welded by welding together with the steel material 3 and the low-temperature thermal spray coating 1 under a condition in which a part of the aluminum or aluminum alloy material 2 is melted, and then the second or subsequent laser radiation may be performed.

That is, by combining the welding conditions of the first embodiment and the second embodiment, the number of blowholes can be more reliably reduced, and the joining strength can be improved.

Example

Hereinafter, the present invention will be described in detail with reference to Examples and Comparative Examples, but the present invention is not limited thereto.

Example

First, a metal coating (low-temperature thermal spray coating) having a thickness of 2 mm was formed on a surface of an aluminum alloy sheet having a thickness of 3 mm by using cold spray.

Thereafter, a steel sheet having a thickness of 1.4 mm was disposed so as to overlap with an aluminum alloy sheet via the obtained metal coating, and the steel sheet and the aluminum alloy sheet were laser-welded by radiating lasers from a opposite surface to a surface in contact with the metal coating, of the steel sheet, thereby manufacturing a joint structure of dissimilar materials. The laser radiation was controlled by a galvano scanner, and the welding was performed linearly once in Example 1 and Example 2 (see FIGS. 2 and 3) and twice in Example 3 (see FIG. 5).

Test materials, conditions of cold spray, and welding conditions are shown below.

[Test Material]

Aluminum alloy sheet: A7N01-T6 material

Steel sheet: hot stamp material (22 MnB steel, tensile strength 1500 MPa grade)

[Conditions of cold spray]

Gas type: nitrogen gas

Gas pressure: 5 MPa

Gas temperature: 1000° C.

Metal powder: iron powder

Average particle size of metal powder: 40 μm

[Conditions of laser welding]

Heat source: fiber laser

Welding speed: 4 m/min (in Example 3, 4 m/min for both laser radiations)

Beam condensing diameter: φ0.6 mm

Welding length: 18.8 mm

Shielding gas: none

Output: Example 1: 5 kW (one time irradiation)

Example 2: 6 kW (one time irradiation)

Example 3: 4 kW+3 kW (twice irradiation)

Comparative Example

A metal coating (low-temperature thermal spray coating) having a thickness of 2 mm was formed on a surface of an aluminum alloy sheet having a thickness of 3 mm using cold spray, and then the aluminum alloy sheet and a steel sheet having a thickness of 1.4 mm were overlapped with each other with the metal coating interposed therebetween, and the steel sheet and the metal coating were laser-welded by radiating lasers from a opposite surface to a surface in contact with the metal coating, of the steel sheet, thereby manufacturing a joint structure of dissimilar materials. In the same manner as in Examples, the laser radiation was controlled by a galvano scanner, and the welding was performed linearly.

Figure 6:
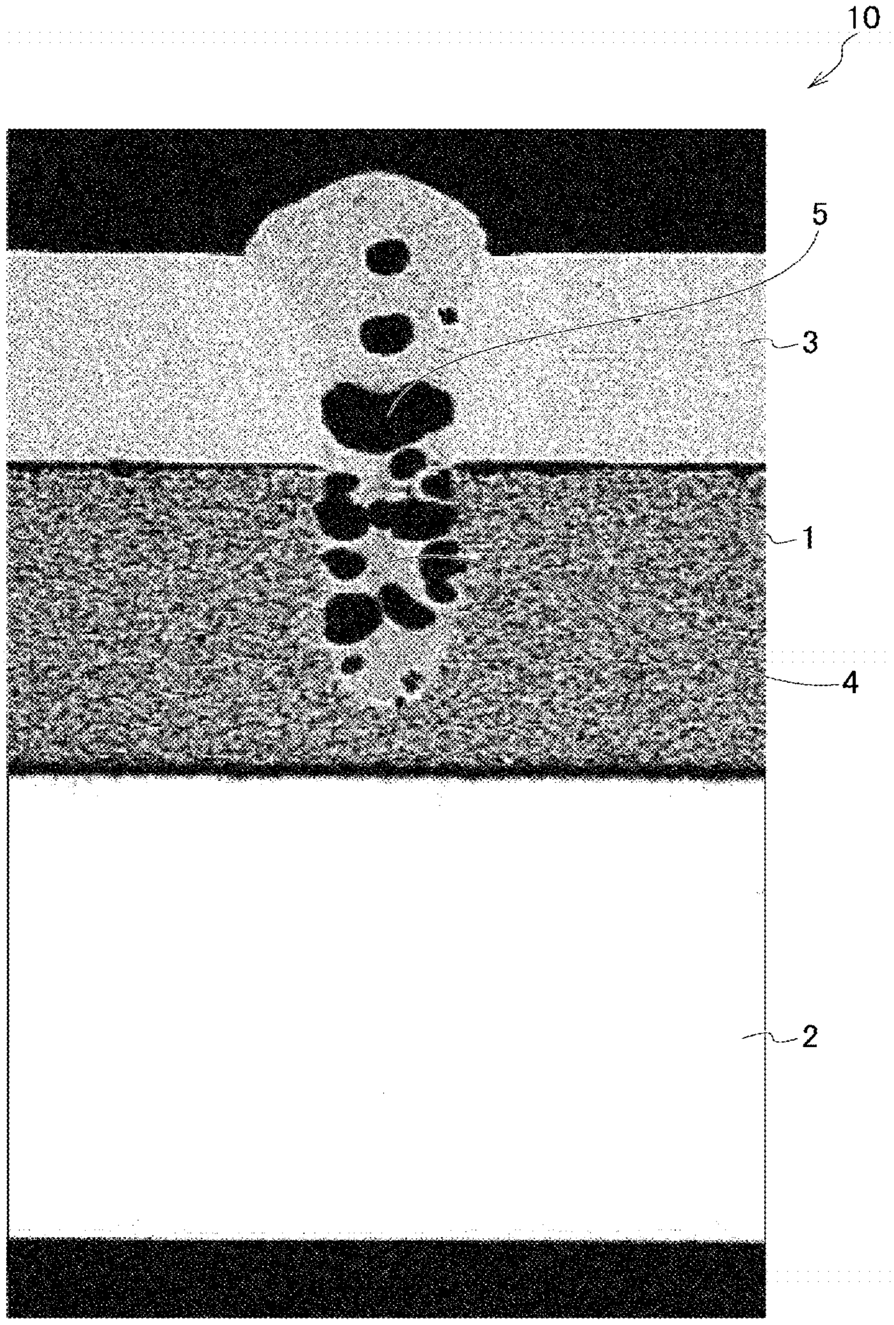
FIG. 6 is an enlarged cross sectional view of a joint structure of dissimilar materials in a comparative example formed by a conventional manufacturing method.

The conditions of laser welding were the same as those in Example, but the laser radiation was performed once at an output of 4 kW (see FIG. 6).

<Evaluation>

Thereafter, in each of Examples and Comparative Example, the joining strength of the obtained joint structure of dissimilar materials was measured, and a cross section cross section macro observation of the joint was performed to examine penetration and a blowhole ratio.

Regarding the joining strength, the tensile shear strength (kN) was measured with reference to test methods described in JIS Z3136 and JIS Z3137. A test speed of the tensile test was 10 mm/min.

Regarding the penetration, a sample in which the melting of the aluminum alloy sheet was confirmed by cross section macro observation was evaluated as "II", and a sample in which the melting of the aluminum alloy sheet was not confirmed was evaluated as "I". The blowhole ratio (%) was calculated as a ratio of an area of the blowhole 5 to an area of the weld metal (molten metal) 4 in the cross sectional macrophotograph, and was rounded off to the nearest whole number.

Figure 3:
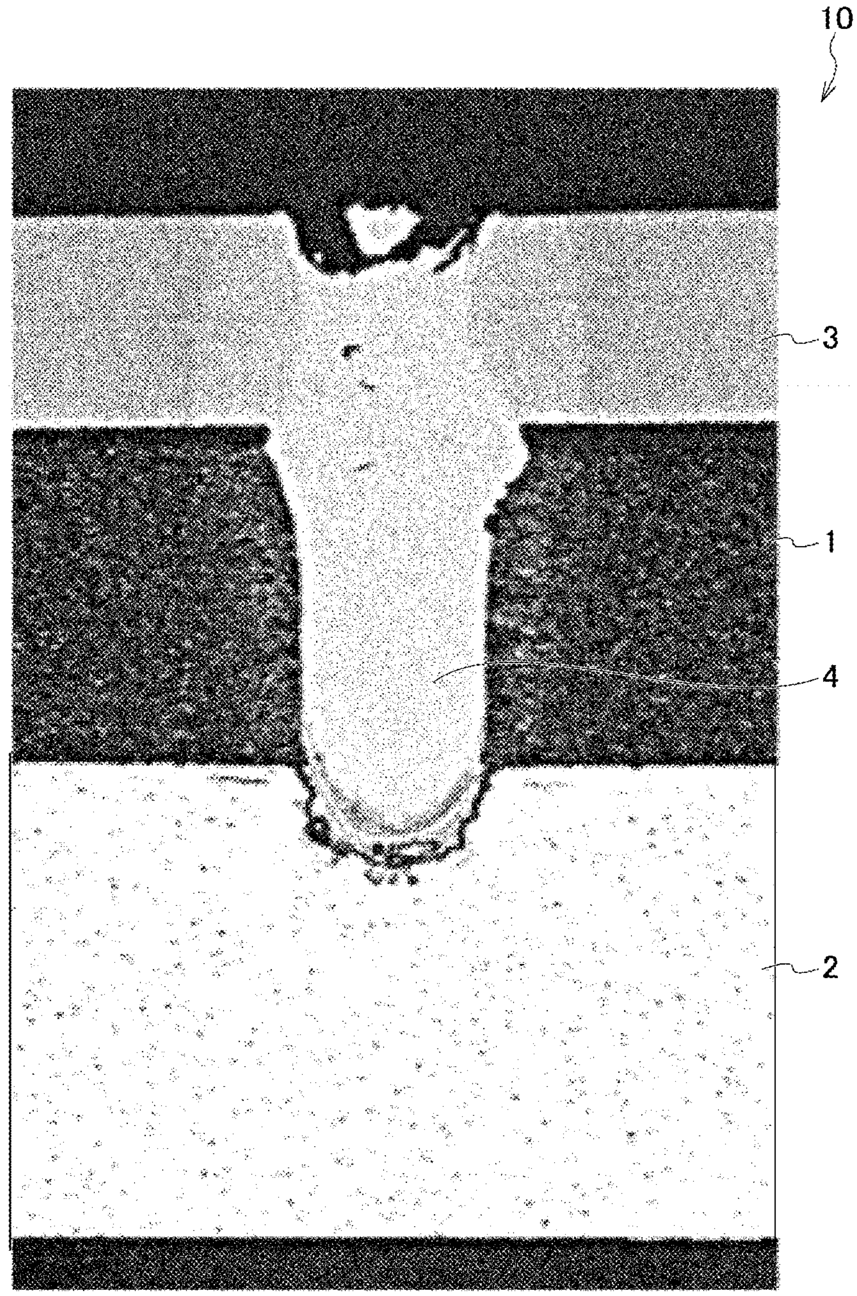
FIG. 3 is an enlarged cross sectional view of a joint structure of dissimilar materials in Example 2 formed by the method for manufacturing a joint structure of dissimilar materials in the first embodiment.

FIG. 2 is a cross sectional view of the joint structure of dissimilar materials in Example 1, FIG. 3 is a cross-sectional view of the joint structure of dissimilar materials in Example 2, FIG. 5 is a cross-sectional view of the joint structure of dissimilar materials in Example 3, and FIG. 6 is a cross-sectional view of the joint structure of dissimilar materials in Comparative Example.

The conditions of laser welding (the number of laser radiations, the first and second laser outputs) and the evaluation results (the penetration of the aluminum alloy sheet, the blowhole ratio (%), and the tensile shear strength (kN)) are shown in Table 1 below. In Table 1, in the "second output (kW)" column indicates that the second laser radiation is not performed.

TABLE 1

| | Number of laser radiations (times) | First output (kW) | Second output (kW) | Penetration | Blowhole ratio (%) | Tensile shear strength (kN) |
|---|---|---|---|---|---|---|
| Example 1 | 1 | 5 | — | II | 0 | 10.1 |
| Example 2 | 1 | 6 | — | II | 0 | 9.8 |
| Example 3 | 2 | 4 | 3 | I | 1 | 10.15 |
| Comparative Example | 1 | 4 | — | I | 29 | 8.9 |

As shown in Table 1 above, in Examples 1, 2, and 3, since the welding conditions satisfied the conditions of the present invention, good welded portions with few blowholes were obtained. In addition, the tensile shear strength was also increased. On the other hand, in Comparative Example, as shown in FIG. 6, many blowholes were generated, and the tensile shear strength was low.

As described above in detail, according to the present invention, welding with less blowholes can be performed by one-sided construction from the steel material side, and a joint structure of dissimilar materials having high joining strength can be obtained.

The present invention is not limited to the embodiments and examples described above, and modifications, improvements, and the like can be made as appropriate. For example, in each example, the output is changed in order to control the amount of heat input, but the amount of heat input may be controlled by changing the welding speed or the beam focal position.

As described above, the following matters are disclosed in the present specification.

(1) A method for manufacturing a joint structure of dissimilar materials, the method including:

forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;

overlapping the aluminum or aluminum alloy material and a steel material such that the low-temperature thermal spray coating and the steel material face each other; and joining the aluminum or aluminum alloy material and the steel material by a laser welding from a steel material side, wherein the joining is performed under a welding condition in which a fusion zone is formed in the steel material, the low-temperature thermal spray coating, and the aluminum or aluminum alloy material.

According to this configuration, welding by one-side construction from the steel material side is enabled, and the number of blowholes is small, and the joining strength is improved.

(2) The method for manufacturing a joint structure of dissimilar materials according to (1), wherein the joining is performed by laser radiation at least twice, and an amount of heat input in a second or subsequent laser radiation is equal to or less than an amount of heat input in a first laser radiation.

According to this configuration, it is possible to further reliably reduce the number of blowholes, and it is possible to improve the joining strength.

(3) A joint structure of dissimilar materials including:

an aluminum or aluminum alloy material;

a low-temperature thermal spray coating formed on at least a part of a surface of the aluminum or aluminum alloy material and formed by low-temperature thermal spraying a metal powder of at least one metal selected from the group consisting of pure iron, carbon steel, stainless steel, nickel, a nickel alloy, cobalt, and a cobalt alloy;

a steel material overlapped on the low-temperature thermal spray coating; and a weld metal by which a fusion zone is formed in the steel material, the low-temperature thermal spray coating, and the aluminum or aluminum alloy material.

According to this configuration, a joint structure of dissimilar materials having excellent joint strength with few blowholes can be obtained by welding by one-side construction from the steel material side.

(4) A method for manufacturing a joint structure of dissimilar materials, the method including:

forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;

overlapping the aluminum or aluminum alloy material and a steel material such that the low-temperature thermal spray coating and the steel material face each other; and joining the aluminum or aluminum alloy material and the steel material by a laser welding from a steel material side, wherein the joining is performed by laser radiation at least twice under a condition in which the low-temperature thermal spray coating is partially penetrated, and an amount of heat input in a second or subsequent laser radiation is equal to or less than an amount of heat input in a first laser radiation.

According to this configuration, since the amount of heat input in the second or subsequent laser radiation is equal to or less than the amount of heat input in the first laser radiation, the generation of blowholes is significantly prevented, and the joining strength is improved.

Although various embodiments have been described above with reference to the drawings, it is needless to say that the present invention is not limited to these examples.

It will be apparent to those skilled in the art that various changes and modifications may be conceived within the scope of the claims, it is also understood that the various changes and modifications belong to the technical scope of the present invention. Components in the embodiments described above may be combined freely within a range not departing from the spirit of the present invention.

The present application is based on Japanese Patent Application No. 2019-154699, filed on Aug. 27, 2019, and the contents thereof are incorporated herein by reference.

REFERENCE SIGNS LIST

1 Low-temperature thermal spray coating
2 Aluminum or aluminum alloy material
3 Steel material
4 Weld metal
10 Joint structure of dissimilar materials
L Laser beam (laser radiation)

What is claimed is:

1. A method for manufacturing a joint structure of dissimilar materials, the method comprising:

forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;

overlapping the aluminum or aluminum alloy material and a steel material such that the low-temperature thermal spray coating and the steel material face each other; and joining the aluminum or aluminum alloy material and the steel material by a laser welding from a steel material side, wherein the joining is performed under a welding condition in which a fusion zone is formed in the joint structure, the fusion zone comprising material from the steel material, the low-temperature thermal spray coating, and the aluminum or aluminum alloy material.

2. The method for manufacturing a joint structure of dissimilar materials according to claim 1, wherein the joining is performed by laser radiation at least twice, and an amount of heat input in a second or subsequent laser radiation is less than an amount of heat input in a first laser radiation.

3. The method of claim 1, wherein the fusion zone comprises aluminum in an amount of greater than 0 mass % to 5 mass %, based on a total mass of the fusion zone.

4. A method for manufacturing a joint structure of dissimilar materials, the method comprising:

forming a low-temperature thermal spray coating on at least a part of a surface of an aluminum or aluminum alloy material by low-temperature thermal spraying a metal powder of at least one metal selected from the group consisting of pure iron, carbon steel, stainless steel, nickel, a nickel alloy, cobalt, and a cobalt alloy;

overlapping the aluminum or aluminum alloy material and a steel material such that the low-temperature thermal spray coating and the steel material face each other; and joining the aluminum or aluminum alloy material and the steel material by a laser welding from a steel material side, wherein the joining is performed by laser radiation at least twice under a condition in which the low-temperature thermal spray coating is partially penetrated, and an amount of heat input in a second or subsequent laser radiation is equal to or less than an amount of heat input in a first laser radiation, and the joining forms a fusion zone in the joint structure that comprises material from the steel material, the low-temperature thermal spray coating, and the aluminum or aluminum alloy material.

5. The method of claim 4, wherein the fusion zone comprises aluminum in an amount of greater than 0 mass % to 5 mass %, based on a total mass of the fusion zone.

* * * * *